April 12, 1949.   T. E. PIAZZE   2,466,735
HEAT-SEALING DEVICE
Filed Oct. 23, 1946   2 Sheets-Sheet 1
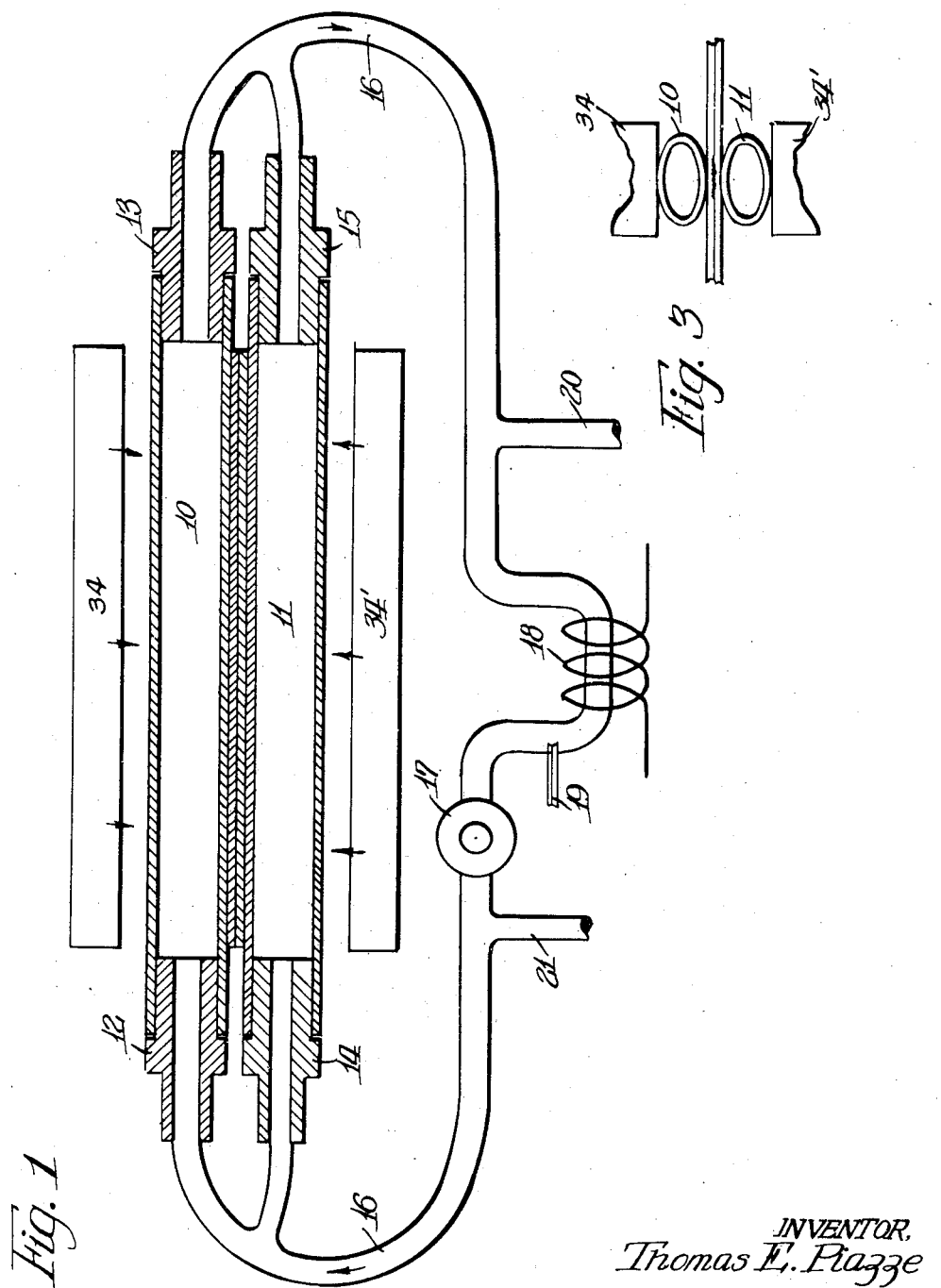
INVENTOR.
Thomas E. Piazze
BY
Cromwell, Greist & Warden
Attys.

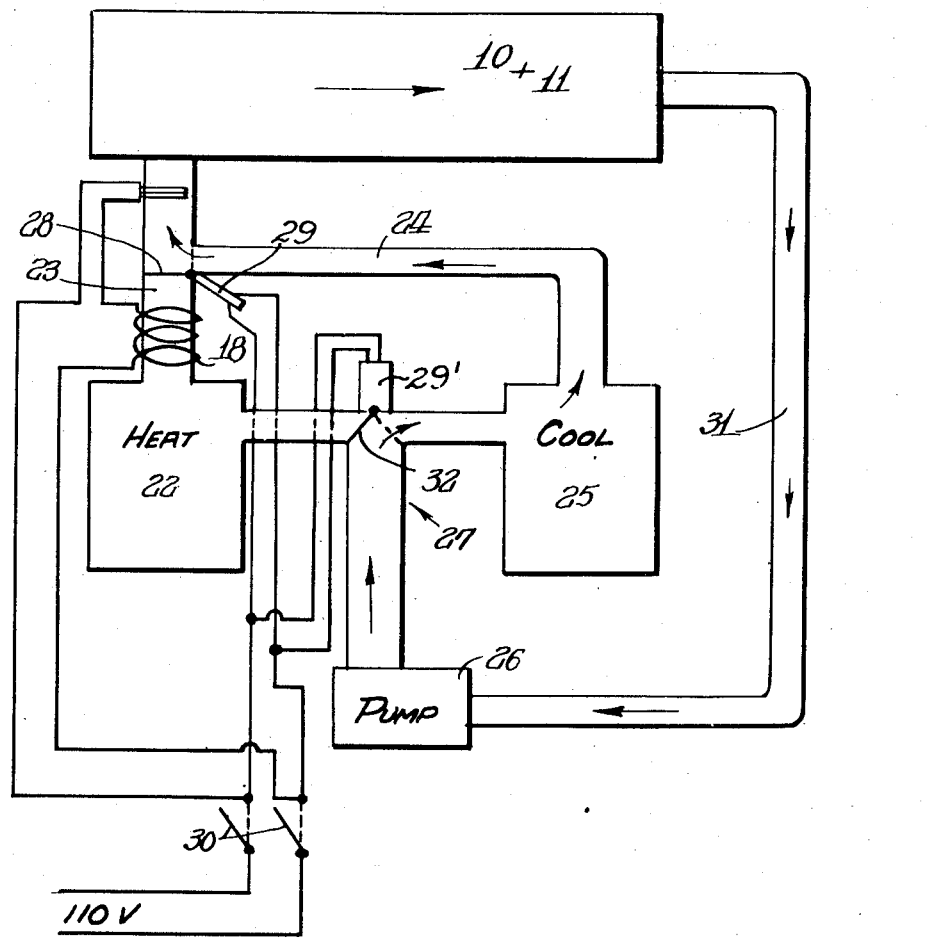

Patented Apr. 12, 1949

2,466,735

UNITED STATES PATENT OFFICE 2,466,735

HEAT-SEALING DEVICE

Thomas E. Piazze, Mount Vernon, Ohio, assignor to Shellmar Products Corporation, Chicago, Ill., a corporation of Delaware Application October 23, 1946, Serial No. 705,130

3 Claims. (Cl. 154—42)

This invention relates to improvements in heat-sealing devices. More particularly, it has to do with a flexible body structure which can be inflated by a heated fluid to bond together heat-sealable materials.

Generally, it is an object of the invention to provide a heat-sealing device for bonding heat-sealable materials comprising a resilient hollow body provided by a substance which is non-compatible with the heat-sealable materials and a fluid for the hollow body which is non-compatible with the body and which can be sufficiently heated to bond the materials when the fluid is contained therein.

More specifically, it is an object of the invention to provide two spaced apart resilient tubular members for bonding heat-sealable materials, the substance of the tubular members being non-compatible with the materials to be bonded and a fluid for the tubular members which is non-compatible therewith and adapted sufficiently to be heated to bond the materials when the fluid is contained in the tubular members, and means to heat and inject the fluid into the body in order to bond the materials. Another object of the invention is to provide a heat-sealing device of the character above described, and means to substitute a cooling medium for the heated fluid into the hollow body or tubular members after bonding the heat-sealable material in order to set the bond therebetween.

Among other specific objects of the invention are the following: a novel type of heat-sealing device which will tend to eliminate irregularities in pressure along a heat-sealed area; to overcome heat storage, that is, to provide a device which will not store heat, thereby overcoming undue temperature fluctuation; and to provide a device which can rapidly be heated and substantially immediately cooled in order to effect better operating control of the materials to be sealed.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a view of a device illustrating a means for practicing the principles of the invention;

Fig. 2 is a view diagrammatically illustrating an arrangement for controlling the injection and circulation of heated and cooled fluid through the device illustrated in Fig. 1; and Fig. 3 is a diagrammatic representation of the heat-sealing principle involved in the present invention.

Referring more particularly to the drawings, there is illustrated in Fig. 1 a preferred embodiment of the device constituting the invention. This comprises a plurality of hollow bodies in the form of tubes 10 and 11. These tubes are made from a substance which has such characteristics as resiliency and flexibility, high heat resistance, that is, a heat resistance which is greater than the capacity needed to heat-seal such pressure sensitive materials as Saran, Pliofilm, Polythene, or materials coated for heat-sealing purposes. Furthermore, such characteristics as oil and water resistivity must be present because such fluids are preferred when heated as the heat-sealing medium. However, any heat-sealing fluid may be used which is not compatible with the materials constituting the hollow body or tubular structures. That is, the heating fluid must be so chosen, for example, that the body member, or tubes, should not be adversely affected thereby, except for ordinary wear and tear during use. Examples of such materials are neoprene or other natural or synthetic rubbers, or any other suitable type of plastic material which will satisfy the above physical properties. Neoprene is a long chain synthetic chloroprene rubber made by polymerization of mono chloro-butadiene.

($H_2C=CClCHCH_2$)

A material which is particularly suitable for the purpose is Tylon, a du Pont product which has recently appeared on the market.

The tubes 10 and 11 are plugged at their ends with plug members 12, 13, 14 and 15. These plug members are connected by a forked conduit 16. Preferably the forked portions of the conduit which enter the plug members 12 and 13 are somewhat larger than the other forked portions which enter the plug members 14 and 15.

Preferably, at some intermediate point in the line, a pump 17 is utilized to circulate the heated fluid. In a suitable section of the conduit leading to the pump a heating coil 18 may be employed for the purpose of heating a fluid such as oil, steam or water before it enters the pump and is circulated under pressure in a direction indicated by the arrows. The heating and cooling of the fluid as it is circulated can be controlled by a thermostat 19.

At any convenient point in the line, as at 20, the conduit can be connected to a storage tank containing a preheated supply of the fluid.

At another point in the line as at 21 the conduit can be connected to a pre-cooled supply source of fluid which preferably is of the same nature as the heated fluid.

One means of utilizing either the heating or cooling fluid, or both, is illustrated in Fig. 2. There is shown a hot fluid supply tank 22 around an outlet 23 of which is wound a heating coil 18. The outlet 23 leads directly to the pressing members or hollow body which diagrammatically illustrates the tubes 10 and 11.

The thermostat 19 projects into the connecting passage, or outlet 23, between the pressing members and the supply tank 22.

Also connected with the passage, or outlet 23, leading from the hot fluid supply tank 22 to the pressing members is a passage 24 connected to a cooling tank 25. A pump 26 connects both the heated fluid tank 22 and the fluid tank 25 by means of a T conduit indicated generally at 27.

Pivoted in the passageway or outlet 23 between the hot fluid supply and the pressing members is a spring flap valve 28 shown in both solid and dotted line position. Connected to this valve is a solenoid 29 which is normally deenergized so that the flap valve 27 will be in the solid line position when the heating medium is not passing into the pressing members. When the poles of the switch 30 are moved to dotted position the circuit will be closed, the solenoid will be energized, pivoting the spring flap valve 28 to the dotted line position. The heated fluid then will pass from the chamber 22 and through the passage 23, whereupon it will be further heated by the coil 18 as it passes into the pressing members 10 and 11. The heated fluid will pass through the pressing members and return to the pump 26 by means of the conduit 31. The fluid will be constantly heated by the coil 18 and maintained at the proper temperature depending on the thermostat 19 until it is desired to stop the flow of the fluid.

In the T conduit 27 there is also provided a spring flap valve 32. This is also connected to a solenoid 29' which is normally deenergized. The solenoid is connected with the line leading to the solenoid 29 so that both solenoids operate in conjunction with each other. Therefore, the closing of the switch 30 to dotted line position also energizes the solenoid 33 which swings the spring flap valve 32 to the dotted line position so that the pump can force the heated fluid through the tank 22, into the passageway 23, thence into the pressing members 10 and 11 and be returned to the pump 26.

After the pressing members have performed their heat-sealing operation upon two contacting members of heat-sealable material, it may be desirable immediately to cool the pressing members. This is accomplished when the switch 30 is thrown to the solid line position. At that time the circuits leading to the solenoids will be deenergized, the spring flap valves 28 and 32 will return to their solid line position, and the pump 26 will force cooling fluid through the passage 24, into the passage 23, thence through the pressing members 10 and 11, recirculate the fluid through the passageway 31 and back to the supply tank 25.

The pressing operation can be enhanced by the utilization of anvil members 34 and 34' which can be actuated against the tubes 10 and 11 by any suitable means. When this construction is used, it will be seen from Fig. 3 that the pressure applied to the tubes 10 and 11, by the anvil members 34 and 34', will so seal the sheets of heat-sealable material that there will be a maximum heat seal at the points of contact of the arcs formed by the intermediate sections of the tubes and there will be a gradual tapering off of the heat-sealing effect so that an ideal seal can be brought about.

While two tubular bodies have been illustrated which can be brought into compressed relation by means of the anvils 34 and 34', it will be understood that only one such body is also contemplated for use when practicing the invention.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention what I claim as new and desire to secure by Letters Patent is:

1. A heat-sealing device for sealing together heat-sealable materials comprising an anvil for supporting superposed sheets of said materials in position for sealing, an expansible tubular member overlying said anvil and spaced therefrom a distance sufficient to receive said materials to be sealed, a circuitous conduit connecting the ends of said tubular member whereby a heated fluid can be circulated under pressure therethrough to heat and expand said tubular member against said materials to seal the same together, a storage tank containing a pre-heated fluid connected to said conduit, a fluid pump for circulating said heated fluid through said conduit from said tank to heat and expand said tubular member, a storage tank containing a pre-cooled fluid connected to said conduit and to said pump, and a conduit connecting said tanks and said pump and having a valve for closing off the supply of heated fluid from circulating through said tubular member after said materials have been sealed and for permitting said pre-cooled fluid to circulate by means of said pump through said tubular member immediately thereafter to cool the sealed materials.

2. A heat-sealing device for sealing together heat-sealable materials comprising two spaced apart expansible tubular members adapted to receive therebetween superposed sheets of said materials to be sealed, a circuitous conduit connecting the ends of said tubular members whereby a heated fluid can be circulated under pressure therethrough to heat and expand said tubular members against said materials to seal the same together, a storage tank containing a pre-heated fluid connected to said conduit, a fluid pump for circulating said heated fluid through said conduit from said tank to heat and expand said tubular members, a storage tank containing a pre-cooled fluid connected to said conduit and to said pump, and a conduit connecting said tanks and said pump and having a valve for preventing the supply of heated fluid from circulating through said tubular member after said materials have been sealed and for permitting said pre-cooled fluid to circulate by means of said pump through said tubular member immediately thereafter to cool the sealed materials.

3. A heat-sealing device for sealing together heat-sealable materials comprising two spaced apart expansible tubular members adapted to receive therebetween superposed sheets of said materials to be sealed, a circuitous conduit connecting the ends of said tubular members whereby a heated fluid can be circulated under pressure therethrough to heat and expand said tubular members against said materials to seal the same together, a storage tank containing a pre-heated fluid connected to said conduit, a fluid pump for circulating said heated fluid through said conduit from said tank to heat and expand said tubular members, a storage tank containing a pre-cooled fluid connected to said conduit and to said pump, a conduit connecting said tanks and said pump and having a valve for preventing the supply of heated fluid from circulating through said tubular member after said materials have been sealed and for permitting said pre-cooled fluid to circulate by means of said pump through said tubular member immediately thereafter to cool the sealed materials, and actuatable rigid anvil members disposed adjacent said tubular members and in axial alignment with each other to urge the tubular members toward each other and to compress them against said materials.

THOMAS E. PIAZZE.

REFERENCES CITED

The following references are of record in the file of this patent:

UNITED STATES PATENTS

| Number | Name | Date |
|---|---|---|
| 2,213,744 | Robertson | Sept. 3, 1940 |